F. A. HECHT, Jr.
ELECTRIC BRAKE.
APPLICATION FILED JULY 16, 1919.
1,359,700.
Patented Nov. 23, 1920.
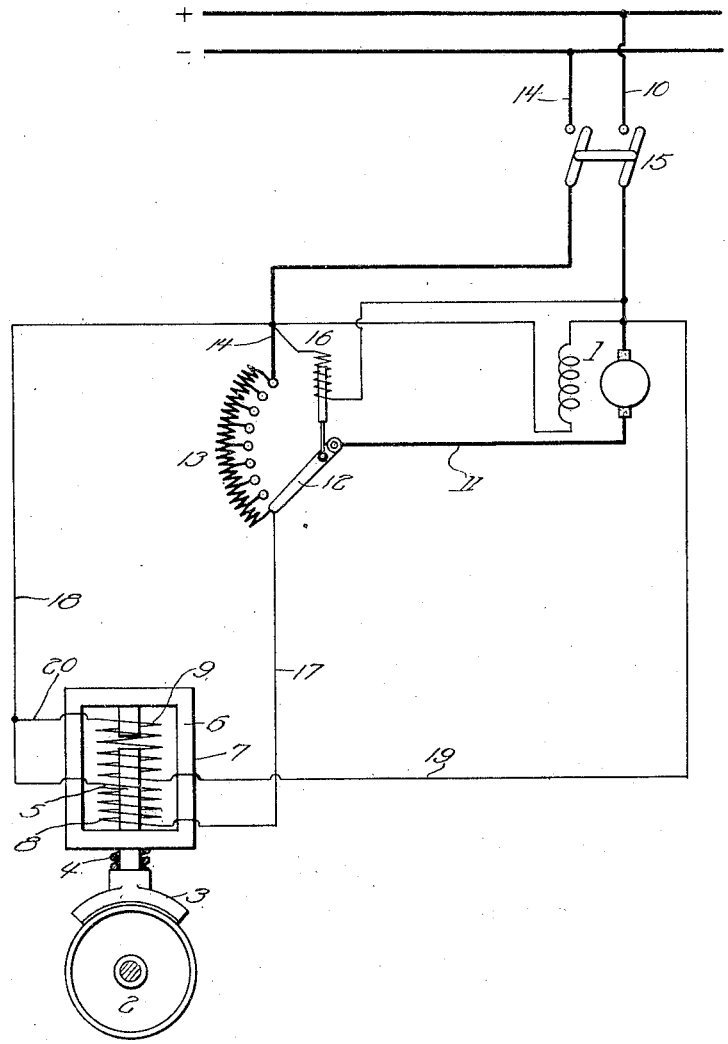
Inventor
Frank A. Hecht Jr.
By Miller Churchill Parker,
Attys.

UNITED STATES PATENT OFFICE.

FRANK A. HECHT, JR., OF CHICAGO, ILLINOIS.

ELECTRIC BRAKE.

1,359,700.  Specification of Letters Patent.  Patented Nov. 23, 1920.

Application filed July 16, 1919. Serial No. 311,386.

*To all whom it may concern:*

Be it known that I, FRANK A. HECHT, Jr., a citizen of the United States, residing at Chicago, in the county of Cook and State of Illinois, have invented certain new and useful Improvements in Electric Brakes, of which the following is a specification.

The invention relates to an electric brake for elevators and the like, embodying an improved arrangement for the actuating windings of the brake magnet.

Electric brakes of the type to which the invention has reference, as commonly constructed and arranged, comprise a brake shoe which is normally held to the brake pulley by means of a spring, and a brake magnet which is arranged in the main motor circuit so that when the circuit is closed, the brake will be lifted. It is very desirable that such lifting of the brake shoe be accomplished immediately upon the closing of the motor circuit, and my invention has particular reference to the provision of brake actuating coils so arranged that when the motor circuit is initially closed, an abnormally large amount of power is used to release the brake, but as the motor approaches its normal speed only sufficient current is used in the brake magnet to maintain the brake shoe in its raised or inoperative position.

In the accompanying drawing, I have shown diagrammatically a preferred embodiment of the invention. 1 is a motor, 2 a brake pulley and 3 a brake shoe. The latter is normally held in operative engagement with the brake pulley by means of a coiled spring 4 surrounding a stem 5 which passes slidably through a frame 6 of an electro-magnet indicated generally at 7. The stem 5 of the brake shoe constitutes the plunger of the magnet, and surrounding said plunger are the magnet windings in the form of two coils 8 and 9. From the plus side of the line the motor circuit leads by way of a conductor 10, through the motor armature, thence by a conductor 11 to the operating lever 12 of a variable resistance coil or rheostat 13. From the rheostat said circuit leads by way of a conductor 14 to the minus side of the line. A suitable switch 15 is interposed in the conductors 10 and 14 to control the flow of current to the motor; and for actuating the rheostat lever when the circuit is closed, there may be provided a magnet 16 operatively connected with the lever 12 and electrically connected to the motor circuit.

The coil 8 of the brake magnet is arranged to be energized only at the initial or starting operation of the motor. To this end I provide a brake circuit in shunt to the rheostat 13 in which is included the winding 8. This circuit is formed by a conductor 17 leading from one side of the rheostat to the coil 8, and a conductor 18 leading from said coil to the conductor 14 of the motor circuit at the opposite side of said rheostat.

It will be seen that when the motor circuit is closed and the rheostat resistance is wholly within it, the voltage across the coil 8 of the brake magnet will be equal to the voltage drop through the rheostat resistance. When, however, the resistance of the rheostat is gradually cut out of the motor circuit by the operation of the magnet 16, the voltage drop across this resistance will become less, thus reducing the voltage impressed on the coil 8 of the brake magnet. When all resistance is cut out, the coil 8 will be short circuited by the arm 12.

The coil or winding 9 of the brake magnet is arranged to be constantly energized and accordingly is shown as connected by means of conductors 19 and 20—18 to conductors 10 and 14, respectively, of the motor circuit. The winding 9, therefore, at the initial operation of the motor assists the coil 8 in quickly lifting the brake shoe 3, and after the motor has attained its speed and the coil 8 is no longer energized, said winding serves to hold the brake shoe in its inoperative position, it being made of sufficient strength for this purpose.

It will be apparent that I have produced an electric brake for motors, of a very practical character and particularly applicable to elevators. The means for deënergizing the lifting coil of the brake magnet is automatic in operation and at the same time is extremely simple, embodying no parts to become worn out or deranged.

I claim as my invention:

1. An electric brake having, in combination with a motor and a variable resistance coil in circuit therewith, a brake circuit in shunt to said resistance coil and having a brake magnet therein, means for cutting said resistance out of the motor circuit and thereby reducing the voltage of the brake circuit, and a second brake circuit having a brake actuating coil therein and arranged to be constantly energized when the motor circuit is closed.

2. An electric brake having, in combination with a motor, a brake magnet having two windings both of which are arranged to be energized when the motor circuit is initially closed, and means for gradually reducing the voltage of one only of said windings to zero during the acceleration of the motor.

3. In an electric brake, the combination with a motor and a variable resistance coil in circuit therewith, of a brake circuit in shunt to said resistance coil and having a brake magnet therein, and means for cutting said resistance out of the motor circuit and thereby reducing the voltage of the brake circuit.

4. In a device of the class described, in combination, a motor armature, a brake, and a coil tending to actuate said brake, said coil being at all times subjected to a voltage not greater than the line voltage minus the voltage drop in the motor armature.

5. In a device of the class described, in combination, a motor armature, a starting resistance in series with said armature, a magnetic brake and an operating coil for said brake shunted across said starting resistance.

6. In a device of the class described, in combination, a motor armature, a brake, magnetic means for relieving said brake, two coils for energizing said magnetic means, one of said coils connected across the line and the other coil receiving energy only during starting of the motor.

7. In a device of the class described, in combination, a motor armature, a brake, magnetic means for relieving said brake, two coils adapted to energize said magnetic means, one of said coils being connected across the line and the other coil being subjected to a voltage not greater than the line voltage minus the voltage drop in the armature.

8. In a device of the class described, a motor armature, a starting resistance for said motor, a contact arm adapted to control said starting resistance, a brake independent of said contact arm and normally preventing rotation of said motor, and electric means for releasing said brake, said electric means being subjected to a voltage not greater than the line voltage minus the voltage drop across the armature.

9. In a device of the class described, a motor armature, a brake normally preventing rotation of said armature, means constantly exerting a tendency to relieve said brake and adequate to hold it in relieved position after it is relieved, and additional means having a variable tendency to relieve said brake, the action of said variable means being a maximum at starting.

10. In a device of the class described, a motor armature, a brake normally preventing rotation of said armature, means constantly exerting a tendency to relieve said brake, and adequate to hold it in relieved position after it is relieved, and additional means having a variable tendency to relieve said brake, the action of said variable means being a maximum at starting, and decreasing gradually to a zero value as said armature comes to full speed.

11. In a device of the class described, a motor armature, a brake normally preventing rotation of said armature, magnetic means constantly energized and adequate to hold said brake in relieved position after it is relieved, and additional magnetic means receiving a variable amount of energy to assist in relieving said brake, the energy received by said last mentioned means being a maximum at starting.

12. In a device of the class described, power mains, a motor connected to said mains, a brake magnet having two windings and a unitary device for simultaneously accelerating the motor and reducing the voltage of one of the coils to zero.

In testimony whereof, I have hereunto set my hand.

FRANK A. HECHT, Jr.